UNITED STATES PATENT OFFICE.

ISAAC L. MERRELL, OF SAN FRANCISCO, CALIFORNIA.

FIRE-PROOF PAINT.

SPECIFICATION forming part of Letters Patent No. 446,922, dated February 24, 1891.

Application filed September 24, 1890. Serial No. 366,014. (No specimens.)

*To all whom it may concern:*

Be it known that I, ISAAC L. MERRELL, a citizen of the United States, residing at San Francisco, in the county of San Francisco and State of California, have invented a new and useful Composition of Matter to be Used as a Fire-Proof Paint, of which the following is a specification.

My composition consists of the following ingredients, combined in the proportion stated, viz: aluminum, one part, by measure; asbestus, pulverized, one part, by measure; soapstone, pulverized, one part, by measure; silicate of soda, one part, by measure; magnesia, one part, by measure; mica, reduced by trituration, one part, by measure; fire-proof clay, pulverized, one part, by measure. To this compound or mixture I then add some suitable coloring matter or substance to produce paints of different colors. For example, to make a white paint I add pulverized gypsum and zinc-white in the proportion of one part each, by measure, and in like manner I add any coloring substance in suitable proportion to give the desired color or shade to the paint. These ingredients are to be thoroughly mingled by trituration or agitation, after which sufficient glue-water and lime-water are added in equal proportions, by measure, to bring the mass to the consistency of cream, or thereabout. It is then passed through an ordinary paint-grinding mill, after which it is fit for use in the ordinary way of applying paints to surfaces.

It will thus be seen that my paint compound contains no inflammable ingredients whatever, and may therefore be termed a "fire-proof" paint.

Having thus described my new paint composition, what I claim, and desire to secure by Letters Patent, is—

The herein-described composition of matter to be used as paint, consisting of aluminum, asbestus, soapstone, silicate of soda, magnesia, mica, fire-proof clay, lime-water, and a cohesive liquid, such as glue in solution, with or without suitable coloring matter or substance, substantially as set forth.

In testimony that I claim the foregoing I have hereunto set my hand and seal.

ISAAC L. MERRELL. [L. S.]

Witnesses:
 EDWARD E. OSBORN,
 LEWIS B. HARRIS.